US011566629B2

(12) United States Patent
Hsu et al.

(10) Patent No.: US 11,566,629 B2
(45) Date of Patent: Jan. 31, 2023

(54) DEVICE FOR REAL-TIME SELF DIAGNOSIS OF A FAN AND THE METHOD USING THE SAME

(71) Applicant: PROLIFIC TECHNOLOGY INC., Taipei (TW)

(72) Inventors: Chia Chang Hsu, Taipei (TW); Chih Feng Huang, Taipei (TW); Wei Shu Hsu, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 347 days.

(21) Appl. No.: 16/751,070

(22) Filed: Jan. 23, 2020

(65) Prior Publication Data

US 2020/0232471 A1    Jul. 23, 2020

(30) Foreign Application Priority Data

Jan. 23, 2019   (TW) ................. 108102473

(51) Int. Cl.
*F04D 27/00*    (2006.01)
*G01P 3/44*    (2006.01)

(52) U.S. Cl.
CPC .............. *F04D 27/001* (2013.01); *G01P 3/44* (2013.01)

(58) Field of Classification Search
CPC .. F04D 27/004; F04D 27/001; F04D 15/0088; G01R 31/343; G05B 2219/37351; G05B 23/0221; G06F 1/206; G06F 17/18; G06F 11/3058; G01M 13/028; G01M 13/045; G01P 3/44; Y02B 30/70

USPC ........ 318/490; 324/765.01; 361/679.48, 688, 361/695; 700/276, 286, 299, 300; 702/34, 56–58, 60, 64, 115, 132, 145, 702/182–183, 185, 188–189
See application file for complete search history.

(56) References Cited

U.S. PATENT DOCUMENTS

| | | | | |
|---|---|---|---|---|
| 5,677,606 A | * | 10/1997 | Otake | D06F 34/16 318/434 |
| 6,338,029 B1 | * | 1/2002 | Abbata | G01R 31/343 318/434 |
| 7,860,663 B2 | * | 12/2010 | Miyasaka | F16C 19/527 73/659 |

(Continued)

FOREIGN PATENT DOCUMENTS

CN    103176887 A    6/2013

*Primary Examiner* — Jeffrey P Aiello
(74) *Attorney, Agent, or Firm* — Muncy, Geissler, Olds & Lowe, P.C.

(57) ABSTRACT

A device for real-time self-diagnosis of a fan and a method are disclosed for detecting whether a fan body encounters an environment abnormal situation. The fan body includes a motor, a fan and a tachometer. The fan body further includes a microcontroller for receiving a speed signal of the tachometer and calculating a speed value of the fan, and detecting a current value of the motor during operation. The microcontroller can control the motor to drive the fan according to a monitoring period and a control signal transmitted from the control board, and can calculate a speed change amount according to the monitoring period, and can calculate a current change amount. When the speed change amount exceeds a speed change threshold and the current change amount exceeds a current change threshold for a period of time, the microcontroller generates an environmental anomaly signal.

22 Claims, 11 Drawing Sheets

(56) References Cited

U.S. PATENT DOCUMENTS

| | | | |
|---|---|---|---|
| 10,060,438 B2* | 8/2018 | Duan | F04D 19/005 |
| 10,073,504 B2* | 9/2018 | Nakanishi | G11B 33/144 |
| 10,198,047 B2* | 2/2019 | Curtis | G06F 1/206 |
| 10,212,844 B2* | 2/2019 | Ragupathi | F04D 25/0613 |
| 10,270,918 B2* | 4/2019 | Bowers | G06F 1/206 |
| 2014/0265956 A1* | 9/2014 | Chretien | H02P 21/05 |
| | | | 318/400.15 |
| 2018/0241332 A1* | 8/2018 | Ottewill | H02P 21/16 |

* cited by examiner

DEVICE FOR REAL-TIME SELF DIAGNOSIS OF A FAN AND THE METHOD USING THE SAME

BACKGROUND OF THE INVENTION

1. Field of the Invention

The present invention relates to a fan, and more particularly to a device for operation status diagnosis of a fan, and a method using the same.

2. Description of the Related Art

With the developments of the Internet technology, financial technology and e-sports industries, the demand for high-performance computers and servers continues to grow. As the machine's operational efficiency is getting higher and higher, the heat dissipation becomes a major technical problem. As a result, the technical requirements for fans in computers, servers and other machines are increasing. How to manage the fan is a very important issue for computer system suppliers and server system suppliers.

In recent years, the technologies related to fan management mainly focus on the management of the reliability of the fan, such as the management of a service life of the fan. For example, Chinese Patent Publication No. CN103176887A, titled as a method and apparatus for monitoring electromechanical device performance and reliability, discloses a method for monitoring a fan, and the method uses an upper boundary and a lower boundary to define a warning range of the fan for determining whether the fan is reliable, or the method also uses an upper boundary and a lower boundary of fan power consumption to define a warning range for determining whether the fan is reliable. However, this method uses only one indicator to define the reliability of the fan, and it is unable to reflect the actual fan condition.

For example, when the abnormal environment occurs around the fan, such as an air inlet of the fan is blocked by a foreign object, or the air inlet of the fan is blocked because the computer or the server is placed near the wall, it also causes abnormal operation of the fan. It is impossible to use the conventional fan management technical solution to identify above situations, and the conventional fan management technical solution may misjudge that the reliability of the fan is abnormal.

Therefore, how to develop a method for operation status diagnosis of a fan, to identify an abnormal fan operation caused by environmental variation, and immediately notify a user to troubleshoot the non-fan-reliability problem, is a key issue for fan device development company and computer host equipment manufacturers.

SUMMARY OF THE INVENTION

An objective of the present invention is to provide a device for operation status diagnosis of a fan, and a method using the same. The device can use a microcontroller to detect a rotation speed and a current of the fan in real time for implementing real-time self-diagnosis of the fan, so as to achieve the technical effect of detecting an environmental abnormal condition around the fan and checking a problem that a fan air inlet is blocked by a foreign object; furthermore, the device and the method of the present invention can eliminate the fan lifespan evaluation caused by such environmental abnormal condition, as so to prevent misjudgment for the fan lifespan.

According to an embodiment, the present invention provides a method for an operation status diagnosis of a fan. A microcontroller is used to perform the operation status diagnosis on a fan body comprising a motor and the fan. The method includes following steps: setting a monitoring period, and receiving a control signal; driving the motor to operate according to the control signal, and reading an average steady-state speed value and an average steady-state current value stored in the microcontroller; calculating a motor speed value and a motor current value, according to the monitoring period; calculating an average instant steady-state speed value and an average instant steady-state current value, according to the monitoring period and a steady-state time; calculating a steady-state speed change amount between the average steady-state speed value and the average instant steady-state speed value, and calculating a steady-state current change amount between the average steady-state current value and the average instant steady-state current value; and generating an environmental anomaly signal when the steady-state speed change amount and the steady-state current change amount exceed a steady-state speed change threshold and a steady-state current change threshold, respectively.

According to an embodiment, the present invention provides a method for an operation status diagnosis of a fan. A microcontroller is used to perform the operation status diagnosis on a fan body comprising a motor and a fan. The method includes following steps: setting the monitoring period, and receiving a control signal; driving the motor to operate according to the control signal; calculating a motor speed value and a motor current value according to a monitoring period; calculating a speed change amount of the motor speed value and a current change amount of the motor current value, according to the monitoring period; and generating an environmental anomaly signal when the speed change amount exceeds a speed change threshold corresponding to the control signal, and the current change amount exceed a current change threshold corresponding to the control signal for a period of time.

According to an embodiment, the present invention provides a method for an operation status diagnosis of a fan. A microcontroller is used to perform operation status diagnosis on a fan body comprising a motor and the fan. The method includes following steps: setting a monitoring period, and receiving a control signal; confirming that an environmental anomaly signal is not generated; calculating a motor speed value and a motor current value, according to the monitoring period; according to the monitoring period and the steady-state time, calculating an average steady-state speed value and an average steady-state current value at the present; reading an average factory default speed value and an average factory default current value; calculating a speed change amount between the average steady-state speed value and the average factory default speed value, and calculating a current change amount between the average steady-state current value and the average factory default current value; and generating a fan replacement suggestion signal when the speed change amount exceeds an accumulated speed change threshold corresponding to the control signal, and the current change amount exceeds an accumulated current change threshold corresponding to the control signal, and the average steady-state speed value is lower than the average factory default speed value, and the average steady-state current value is higher than the average factory default current value.

According to an embodiment, the present invention provides a device for an operation status diagnosis of a fan, for diagnosing whether a fan body encounters an environment abnormal condition. The fan body includes a motor, the fan and a tachometer. The device includes a microcontroller installed in the fan body and connected to a control board, configured to receive a speed signal of the tachometer, and calculate a speed value of the fan, and detect a current value of the motor during operation. The microcontroller drives the motor to operate to drive the fan, according to a monitoring period and a control signal transmitted from the control board, and calculates a speed change amount, according to the monitoring period and calculates a current change amount, and when the speed change amount exceeds a speed change threshold corresponding to the control signal the current change amount exceeds a current change threshold corresponding to the control signal for a period of time, the microcontroller generates an environmental anomaly signal.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
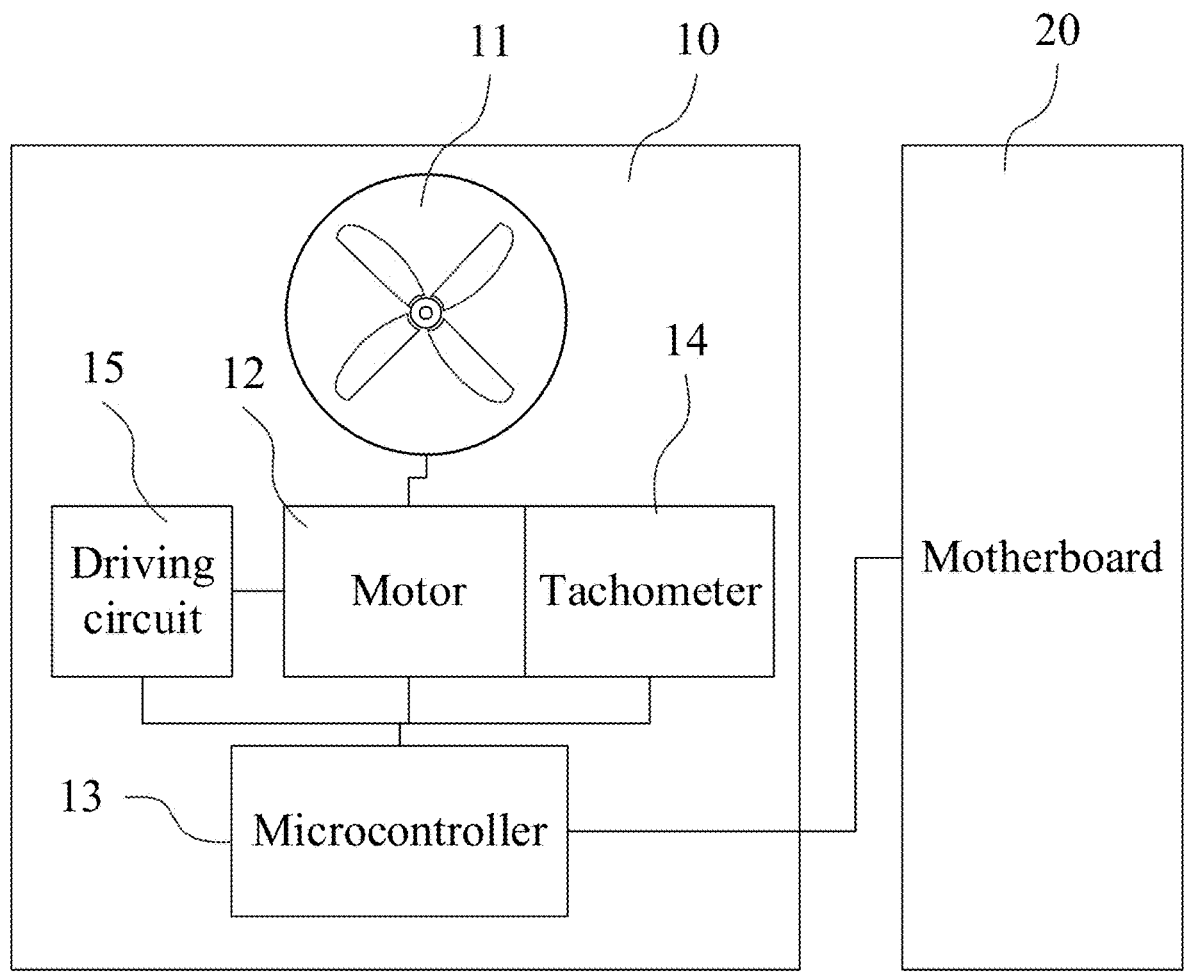
FIG. 1 is a functional block diagram of a device for operation status diagnosis of a fan, according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

According to the system and method of the present invention, a microcontroller is installed in the fan to detect a rotation speed and a current of the fan in real time, so as to implement a real-time self-diagnosis of the fan, thereby achieving the technical effect of detecting an environment abnormal condition occurring around the fan and checking the problem that a fan air inlet is blocked by a foreign object. Furthermore, the present invention can eliminate a fan lifespan evaluation generated according to such environmental abnormal condition, and prevent misjudgment for the fan lifespan.

Please refer to FIG. 1, which is a functional block diagram of a device for operation status diagnosis of a fan, according to an embodiment of the present invention. The device is configured to detect or diagnose whether a fan body 10 encounters an environment abnormal condition. The fan body 10 can include a fan 11, a motor 12, a tachometer 14, a microcontroller 13 and a driving circuit 15. The microcontroller 13 and the driving circuit 15 are installed in the fan and connected to the motherboard 20. For example, at least one of the microcontroller 13 and the driving circuit 15 can be implemented by a driver chip. The motherboard 20 can also be called as a control board, for example, the control board can be a motherboard of a computer or a control board of a server. The microcontroller 13 is connected to the tachometer 14, and configured to receive a speed signal from the tachometer 14 to calculate a speed value of the fan 11. The microcontroller 13 also detects a current value of the motor 12 during operation. An analog-to-digital converter in the microcontroller 13 can calculate the current flowing through a Shunt resistor connected to the motor 12 in series, so as to obtain an average current value of the current value of the motor 12.

Furthermore, the microcontroller 13 can drive the motor 12 to operate for driving the fan 11 according to a monitoring period and a control signal transmitted from the control board. For example, the monitoring period can be 0.1 seconds, 0.5 seconds, 1 second, or the like. For example, a connection line between the microcontroller 13 and the control board can be an I2C connection line; and a PWM signal for a 4-line fan or a DC voltage for a 3-line fan can serve as the control signal and transmitted through the I2C connection line. The microcontroller 13 can calculate a speed change amount and a current change amount according to the monitoring period. When the speed change amount exceeds a preset speed change threshold corresponding to the control signal and the current change amount exceeds a preset current change threshold corresponding to the control signal for a period of time such as 5 seconds, 10 seconds or 30 seconds, the microcontroller 13 can generate an environmental anomaly signal to the control board.

According to an embodiment of the present invention, the instant changes in speed and current of the fan can be monitored under the same control signal, such as a PWM Duty signal or a DC voltage signal. When the instant rotation speed and current of the fan are detected to be drastically changed according to the change threshold defined by the present invention, the microcontroller 13 can determine that the fan body encounters the environment abnormal condition.

In an embodiment, when the speed change amount is a positive value and the current change amount is a negative value, or the speed change amount is a negative value and the current change amount is a positive value, the microcontroller 13 can generate the environmental anomaly signal.

In an embodiment, the speed change threshold can be defined as 3% or more, and it indicates that the speed change threshold is 3% or more of the average speed value before change, and the current change threshold can be defined as 3% or more, and it indicates that the current change threshold is 3% or more of the average current value before change. In other words, a change between the two speed values detected at the two time points of the monitoring period is detected first, and the speed value detected after change is higher than the speed value detected before the change by 3% or more. The definition of the current change threshold can be determined by the same manner. In another embodiment of the present invention, the speed change threshold and the current change threshold can also be set as 5%, 10%, 15% or more.

Furthermore, the speed change threshold and current change threshold can depend on a duty value of the PWM signal, for example, when the duty value of the PWM signal is 50%, the speed change threshold and the current change threshold can be set as 5%; when the duty value of the PWM signal is 60%, the speed change threshold and the current change threshold can be set as 6%; when the duty value of the PWM signal is 70%, the speed change threshold and the current change threshold can be set as 7%; when the duty value of the PWM signal is 80%, the speed change threshold and the current change threshold can be set as 8%; when the duty value of the PWM signal is 90%, the speed change threshold and the current change threshold can be set as 9%; when the duty value of the PWM signal is 100%, the speed change threshold and the current change threshold can be set s 10%; when the duty value of the PWM signal is 40%, the speed change threshold and the current change threshold can be set as 4%; when the duty value of the PWM signal is 30%, the speed change threshold and the current change threshold can be set as 3%, and so on. In some embodiments of the present invention, the speed change threshold and the current change threshold can be set as different values for different fan; and the speed change threshold and the current change threshold can be set as different values corresponding to different control signal, such as the PWM signal or the DC voltage signal. In other words, different fan responds differently to an environmental abnormal condition, so the speed change threshold and the current change threshold can be set as different values for different fan. In an embodiment, the speed change threshold and the current change threshold can also be set as the same values, such as 3% or 5%, for all types of fans or all types of control signals.

By real-time monitoring the rotation speed and the current of the motor 12 of the fan 11 during operation, the device and the method of the present invention can realize real-time self-monitoring of the fan body 10 for an environmental condition; in the other words, the microcontroller 13 installed in the fan body 10 can enable the fan body 10 to perform the status self-monitoring without using the control board.

Furthermore, the device for real-time self-diagnosis of a fan of the present invention can realize environmental condition self-diagnosis of different fan. For example, the fan can be classified into one of four types, including a centrifugal fan, an axial flow fan, a diagonal flow fan, or a cross flow fan. When the air inlet of the fan is blocked by a foreign object, under the same control signal having the same duty value or DC voltage, the current of the fan possibly decreases and the rotation speed of the fan possibly increases, or the current of the fan possibly increases and the rotation speed of the fan possibly decreases; and these two situations are completely different from the aging situation of the fan. As these abnormal conditions occurs, the rotation speed and the current of the fan are changed instantly, so real-time monitoring for the rotation speed and the current of the fan can detect these abnormal conditions, and the conventional occasional detection causes misjudgment immediately.

According to some embodiments of the present invention, the device for real-time self-diagnosis of the fan can implement a variety of fan real-time self-diagnosis methods including an environmental condition diagnosis each when the fan is powered on, a real-time environmental condition diagnosis, and a fan aging condition diagnosis. The embodiments using different rotation speed changes and current changes will be described in following paragraphs, respectively.

Figure 2A:
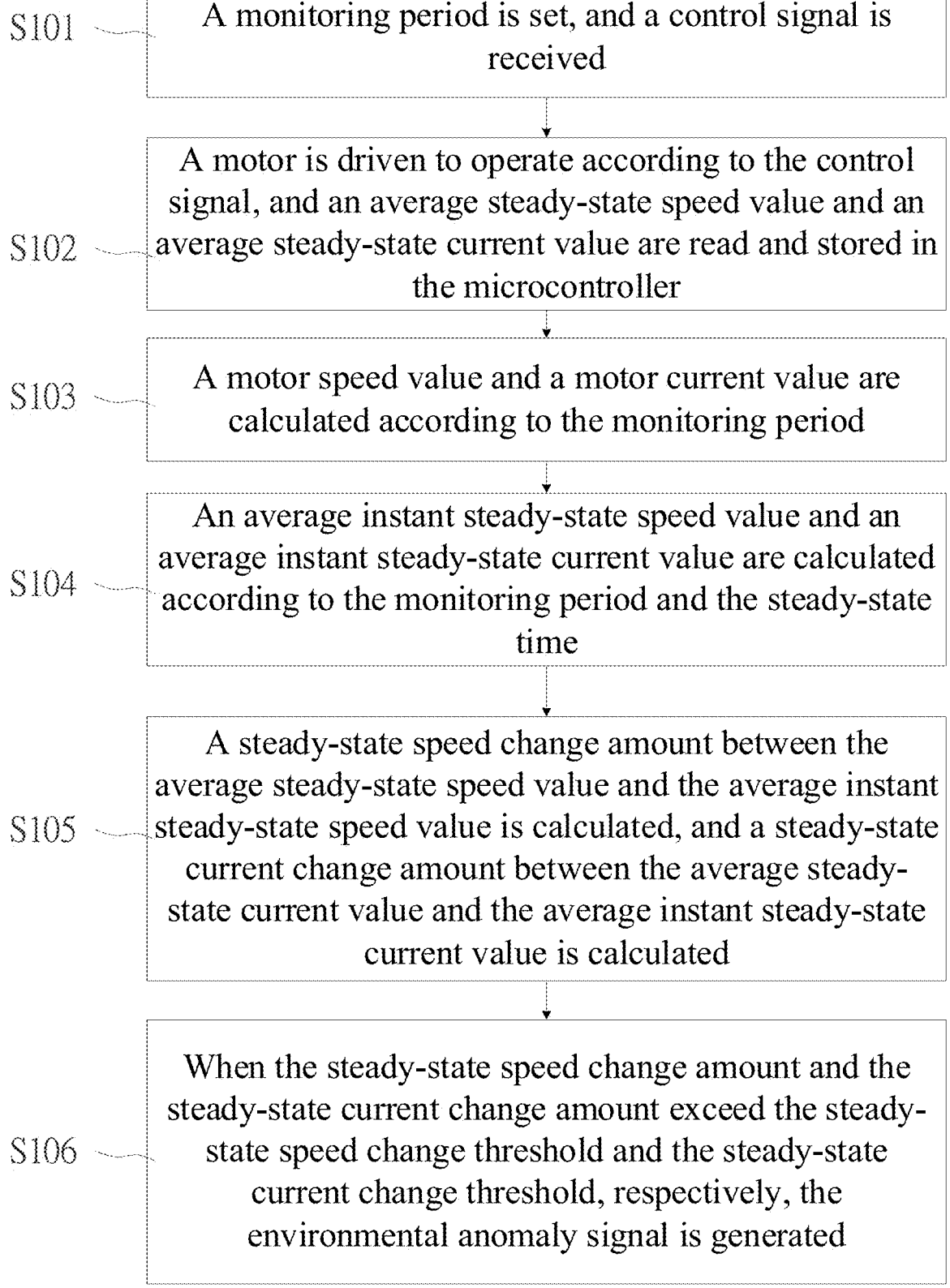
FIGS. 2A to 2D are a flowchart of a method for operation status diagnosis of a fan, and data diagrams of the fan corresponding to several abnormal environmental changes, according to an embodiment of the present invention, respectively.

Please refer to FIGS. 2A to 2D, which are a flowchart of a method for real-time self-diagnosis of the fan, and data diagrams of the fan corresponding to several abnormal environmental changes, according to an embodiment of the present invention, respectively. As shown in FIG. 2A, the flowchart describes a process of detecting or diagnosing whether the fan body 10 encounters an environment abnormal condition each when the fan is powered on, and the flowchart includes steps S101 to S106.

In a step S101, a monitoring period is set, and a control signal is received. In an embodiment, the monitoring period is settable, for example, the monitoring period can be set as 0.1 seconds, 0.5 seconds or 1 second, and the control signal can be a PWM signal or a voltage signal.

In a step S102, the motor is driven to operate according to the control signal, and an average steady-state speed value and an average steady-state current value are read and stored in the microcontroller. In a condition that the motor is normally operating before last power-off, the microcontroller 13 can monitor the rotation speed and the current of the motor 12 in real time after the fan is powered on, and obtain and store the average steady-state speed value and the average steady-state current value.

In a step S103, the motor speed value and the motor current value are calculated according to the monitoring period. The calculation manner of these two values are the same as the above-mentioned manners, so detailed descriptions are not repeated herein.

In a step S104, the average instant steady-state speed value and the average instant steady-state current value are calculated according to the monitoring period and the steady-state time. In an embodiment, the average instant steady-state speed value and the average instant steady-state current value are the average values detected after the fan is powered on this time.

In a step S105, a steady-state speed change amount between the average steady-state speed value and the average instant steady-state speed value is calculated, and a steady-state current change amount between the average steady-state current value and the average instant steady-state current value is calculated.

Figure 2B:
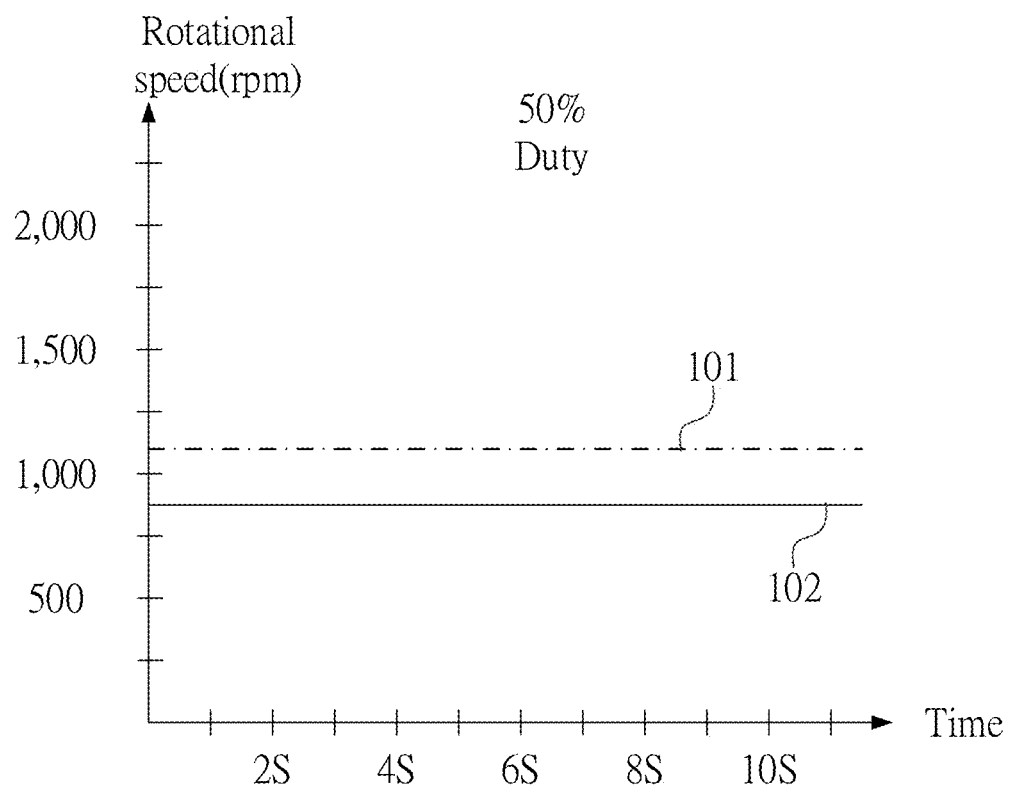
Figure 2B:
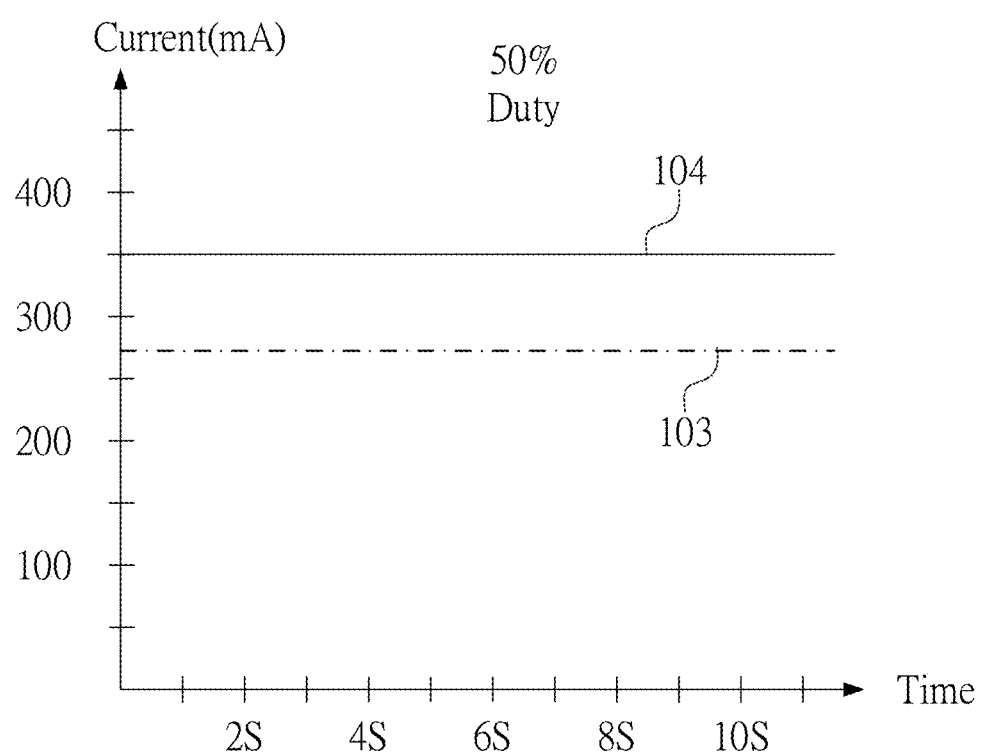

In a step S106, when the steady-state speed change amount and the steady-state current change amount exceed the steady-state speed change threshold and the steady-state current change threshold, respectively, the environmental anomaly signal is generated. In an embodiment, the steady-state speed change threshold can be defined for the condition where the average instant steady-state speed value 102 is higher than the average steady-state speed value 101, and the steady-state current change threshold can be defined for the condition where the average instant steady-state current value 104 is lower than the average steady-state current value 103, as shown in FIG. 2D, and this condition indicates that the fan air inlet of the centrifugal fan or the axial-flow fan is blocked; or, the steady-state speed change threshold can be defined for the condition where the average instant steady-state speed value 102 is lower than the average steady-state speed value 101, and the steady-state current change threshold can be defined for the condition where the average instant steady-state current value 104 is higher than the average steady-state current value 103, as shown in FIG. 2B, and this condition indicates that the fan air inlet of the diagonal flow fan or the cross flow fan is blocked. In the embodiment, when the environment abnormal condition occurs, the direction of the change in the average rotation speed is opposite to the direction of the change in the average current. The steady-state speed change threshold can be defined as 3% or more, and it indicates that the steady-state speed change threshold is 3% or more of the average steady-state speed value. The steady-state current change threshold can be defined as 3% or more, and it indicates that the steady-state current change threshold is 3% or more of the average steady-state current value. The steady-state speed change threshold and the steady-state current change threshold can be set as different values according to different control signal, such as the PWM signal with the duty cycle in a range of 10% to 100%; alternatively, the steady-state speed change threshold and the steady-state current change threshold can be set as the same values, as described above, so detailed descriptions are not repeated herein.

Obviously, when rapid changes in the steady-state speed change amount and the steady-state current change amount is detected after power-on, it indicates the environment around the fan varies severely, and the microcontroller 13 can determine that the environmental abnormal condition occurs.

Figure 2C:
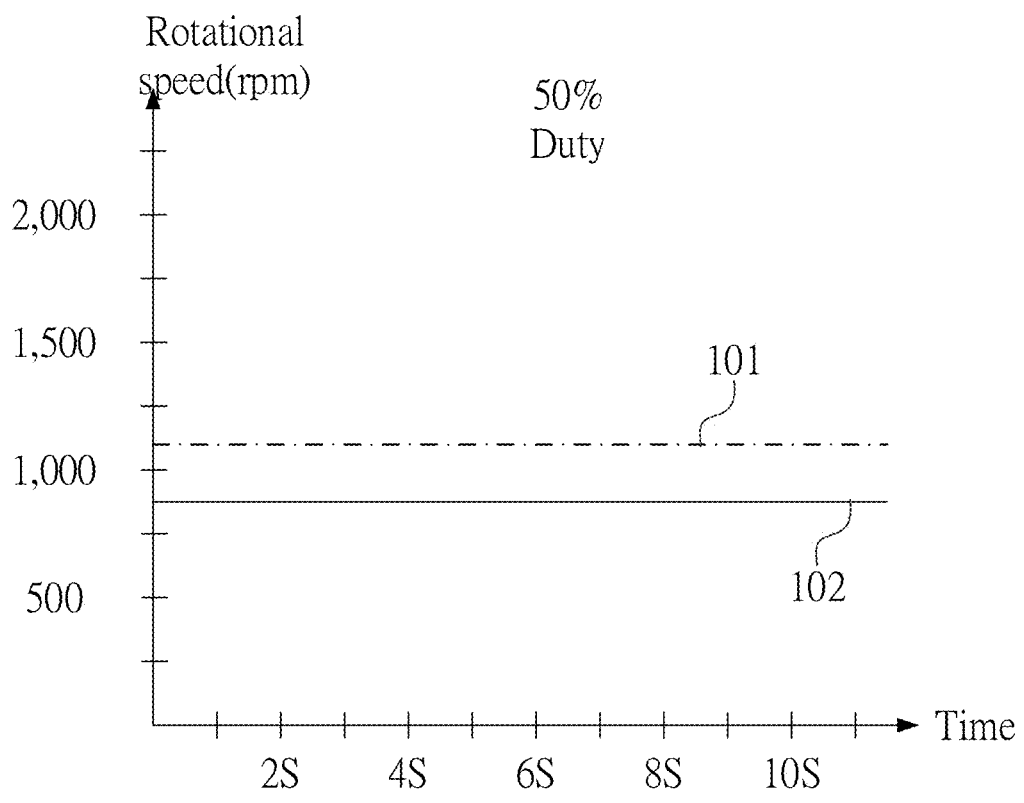
Figure 2C:
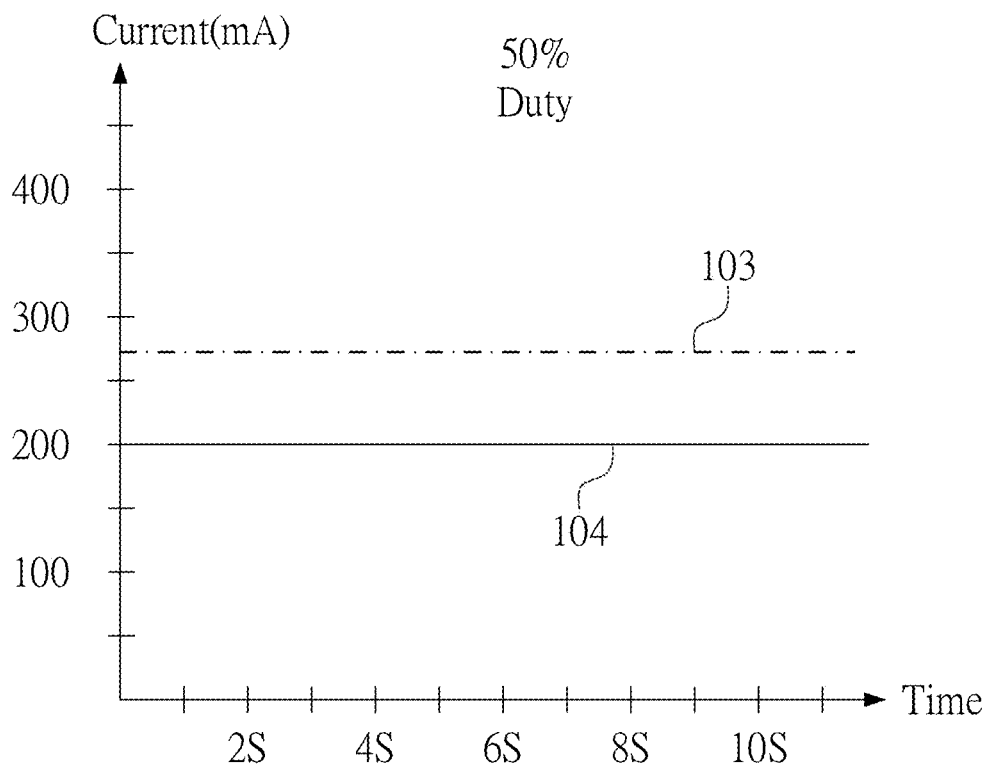
Figure 2D:
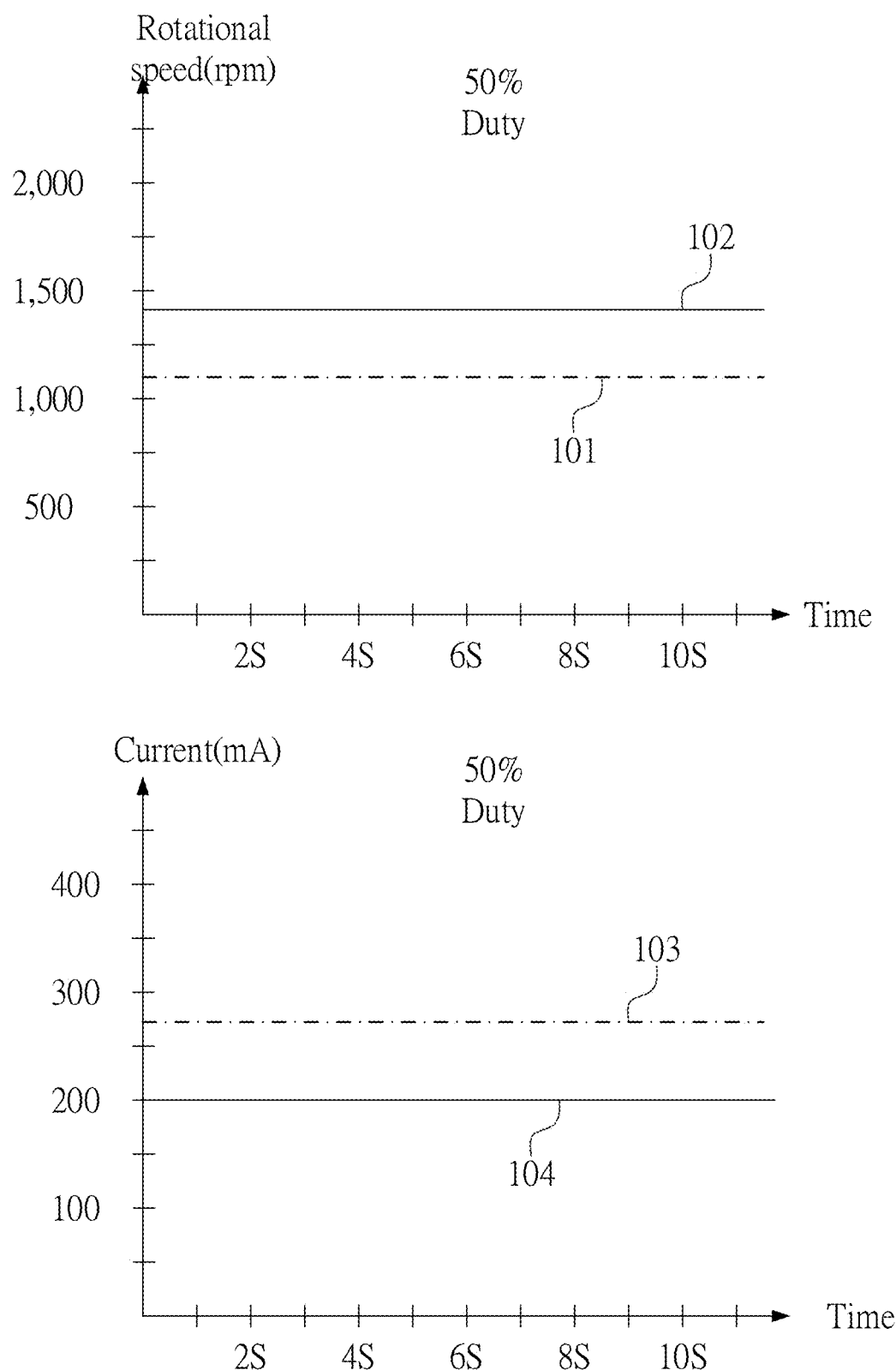

Furthermore, as shown in FIG. 2C, the steady-state speed change amount and the steady-state current change amount indicate that the average instant steady-state speed value 102 is lower than the average steady-state speed value 101 and the average instant steady-state current value 104 is also lower than the average steady-state current value 103; in other words, the average instant steady-state speed value 102 and the average instant steady-state current value 104 are lower than the average steady-state speed value 101 and the average steady-state current value 102 detected before the fan is powered off last time, it indicates that the system voltage rapidly drops possibly, and this condition can be categorized into the environment abnormal condition of the present invention.

Furthermore, in the embodiment shown in FIGS. 2B to 2D, the duty of the PWM signal is 50%; in other words, the average instant steady-state speed value 102, the average steady-state speed value 101, the average instant steady-state current value 104, the average steady-state current value 103 are obtained in a condition that the 50% duty is continuously provided. When the duty of the PWM signal is kept at the same value and no special condition occurs, the difference between the average instant steady-state speed value 102 and the average steady-state speed value 101, and the difference between the average instant steady-state current value 104 and the average steady-state current value 103 should be very small. However, when the differences are high, it can determine that the environment abnormal condition occurs. Even in case of the fan aging, the rapid change does not occur just overnight. In another embodiment of the present invention, the DC voltage signal can be applied as the control signal and the same result can be obtained, so detailed descriptions are not repeated herein.

Please refer to FIGS. 3A to 3D, which are a flowchart of a method for operation status diagnosis of a fan, and data diagrams of the fan corresponding to several abnormal environmental changes, according to an embodiment of the present invention, respectively. The flow is a process of diagnosing or detecting in real time whether the fan body 10 encounters the environment abnormal condition, and the flow includes steps S111 to S115.

In a step S111, a monitoring period is set and a control signal is received. The monitoring period can be set as 0.1 seconds, 0.5 seconds, 1 second, or the like. In an embodiment, the control signal can be a PWM signal or a voltage signal.

In a step S112, the motor is driven to operate according to the control signal. For example, the microcontroller 13 can control the driving circuit 14 to drive the motor to operate, according to the monitoring period and the control signal, such as a duty of the PWM signal or a DC voltage of the voltage signal.

In a step S113, a motor speed value and a motor current value are calculated according to the monitoring period. The calculation formulas of the motor speed value and the motor current value are the same as the above-mentioned manner, so detailed descriptions are not repeated herein.

In a step S114, a speed change amount of the motor speed value and a current change amount of the motor current value are calculated according to the monitoring period.

Figure 3A:
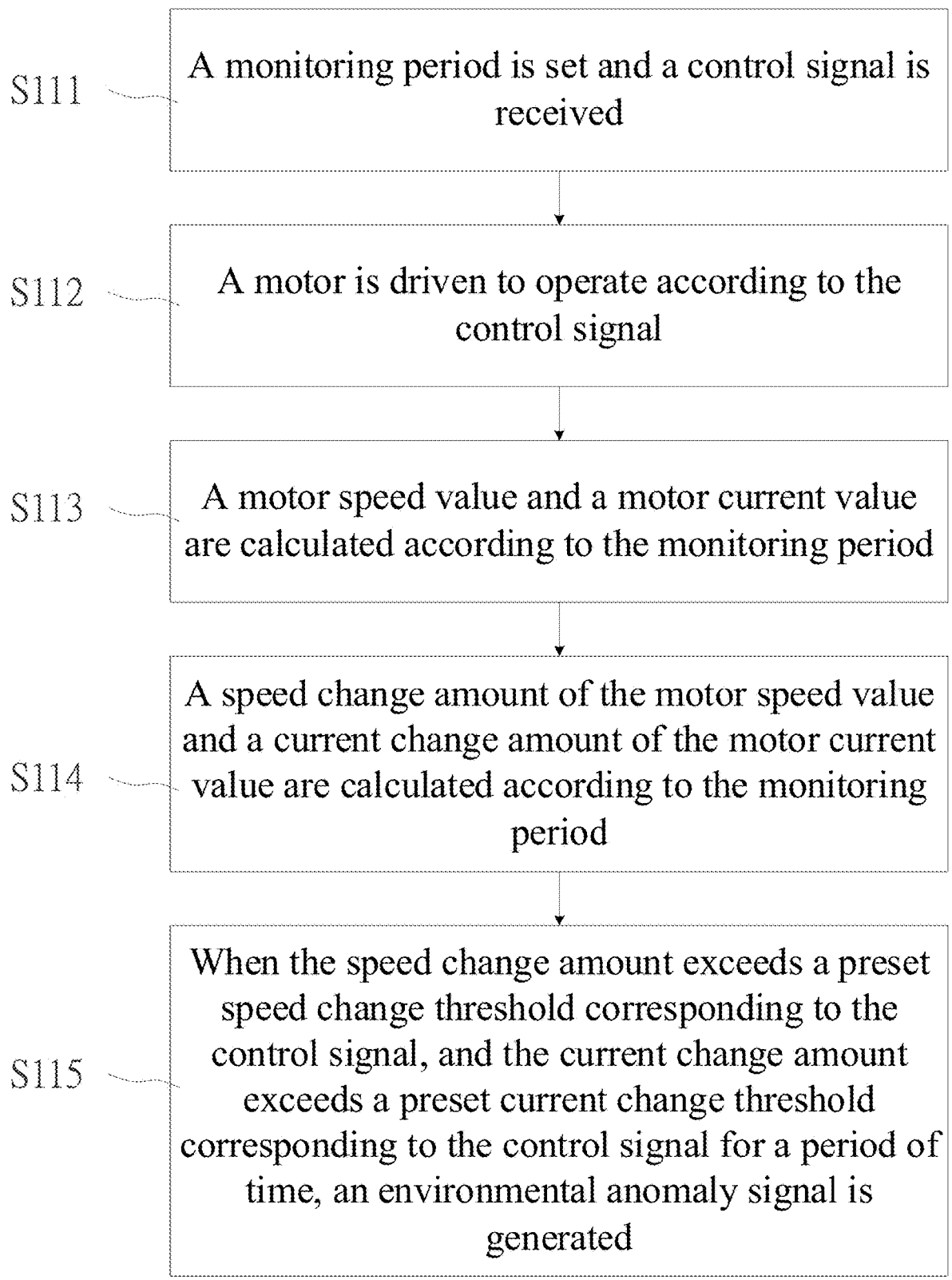
FIGS. 3A and 3D are a flowchart of a method for operation status diagnosis of a fan, and data diagrams of the fan corresponding to several abnormal environmental changes, according to an embodiment of the present invention, respectively.
Figure 3B:
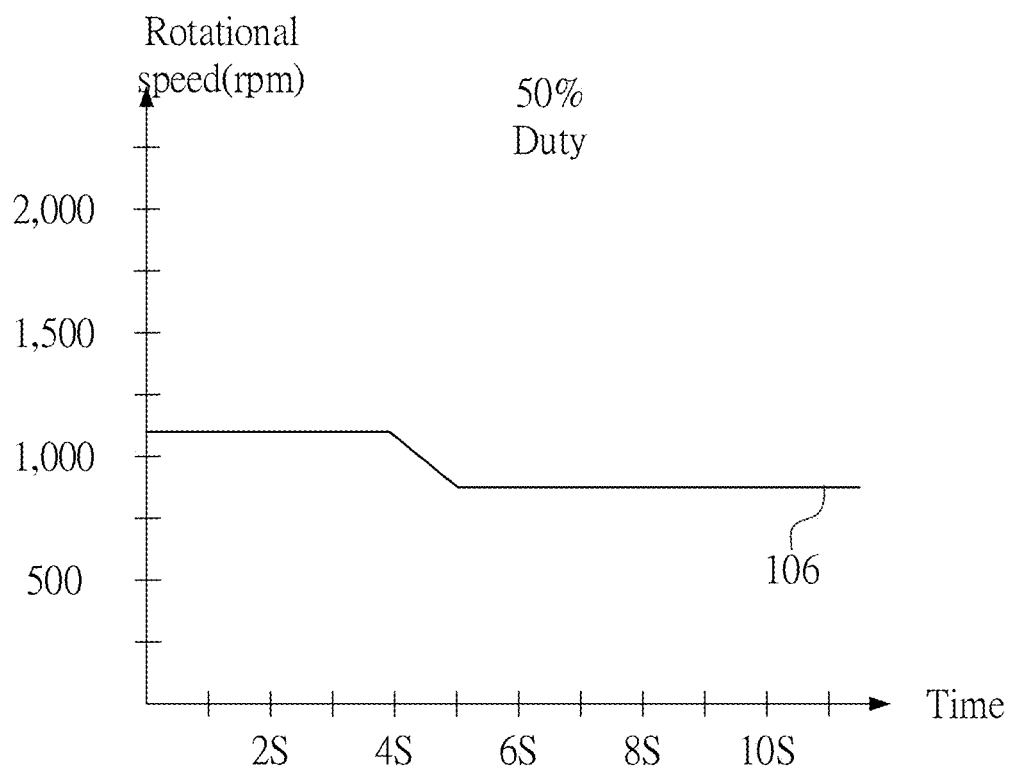
Figure 3B:
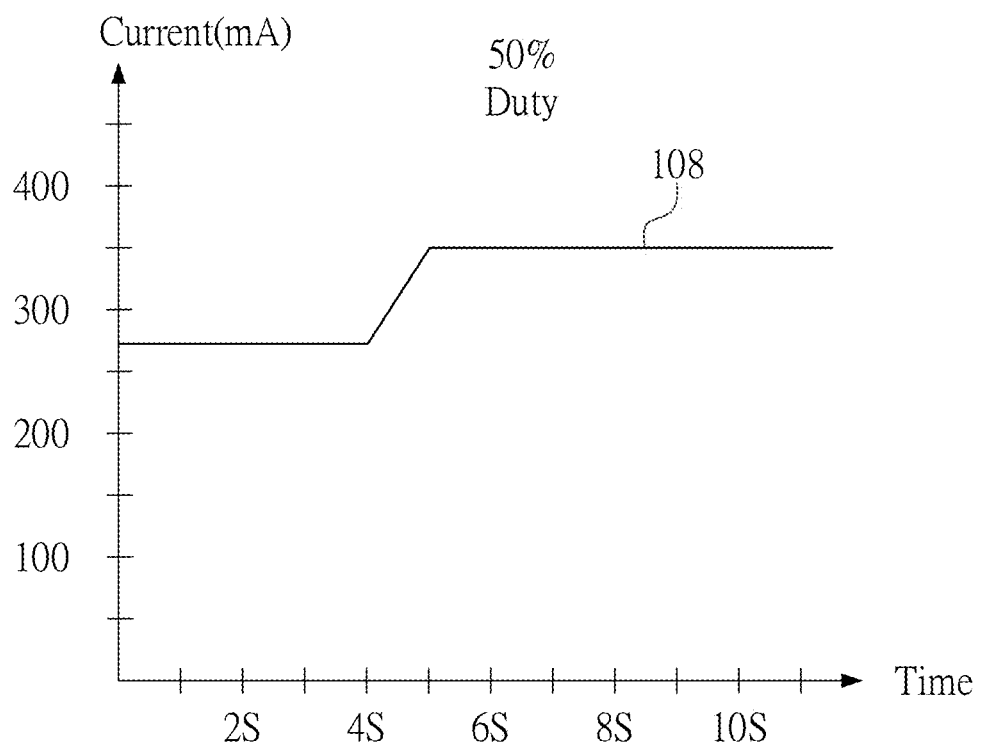

In a step S115, when the speed change amount exceeds a preset speed change threshold corresponding to the control signal, and the current change amount exceeds a preset current change threshold corresponding to the control signal for a period of time, an environmental anomaly signal is generated. For example, the period of time can be set as 1 second, 3 seconds, 5 seconds, or 10 seconds. The speed change threshold and the current change threshold can indicate that the speed change amount is a positive value and the current change amount is a negative value; alternatively, the speed change amount is a negative value and the current change amount is a positive value. In other words, when the instant speed value 106 becomes lower and the instant current value 108 becomes higher, as shown in FIG. 3B, it indicates a first condition of the fan air inlet being blocked; or, when the instant speed value 106 becomes higher and the instant current value 108 becomes lower, as shown in FIG. 3D, it indicates a second condition of the fan air inlet being blocked, for example, the fan air inlet of the centrifugal fan or the axial flow fan is blocked. The speed change threshold can be set as 3% or more of the average motor speed value before change, and the current change threshold can be set as 3% or more of the average current value before change. The speed change threshold and the current change threshold can be set as different values according to different control signal, such as the PWM signal having a duty in a range of 10% to 100%; alternatively, the speed change threshold and the current change threshold can be set as the same percentages (such as 3% or 5%) of the average motor speed value and the average current value before change, as described above, so detailed descriptions are not repeated herein.

Obviously, when the rapid changes in the speed change amount and current change amount are detected in real time in the step S115, it indicates a severe environmental variation affects the fan body 10, and the microcontroller 13 can determine that an environmental abnormal condition occurs.

Figure 3C:
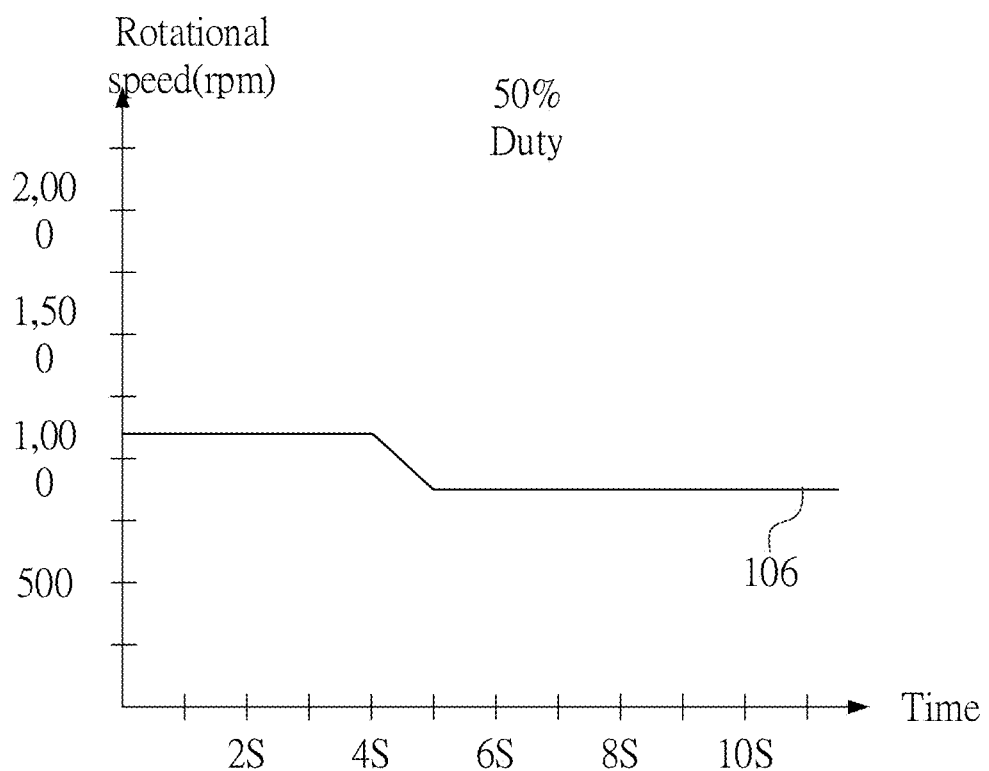
Figure 3C:
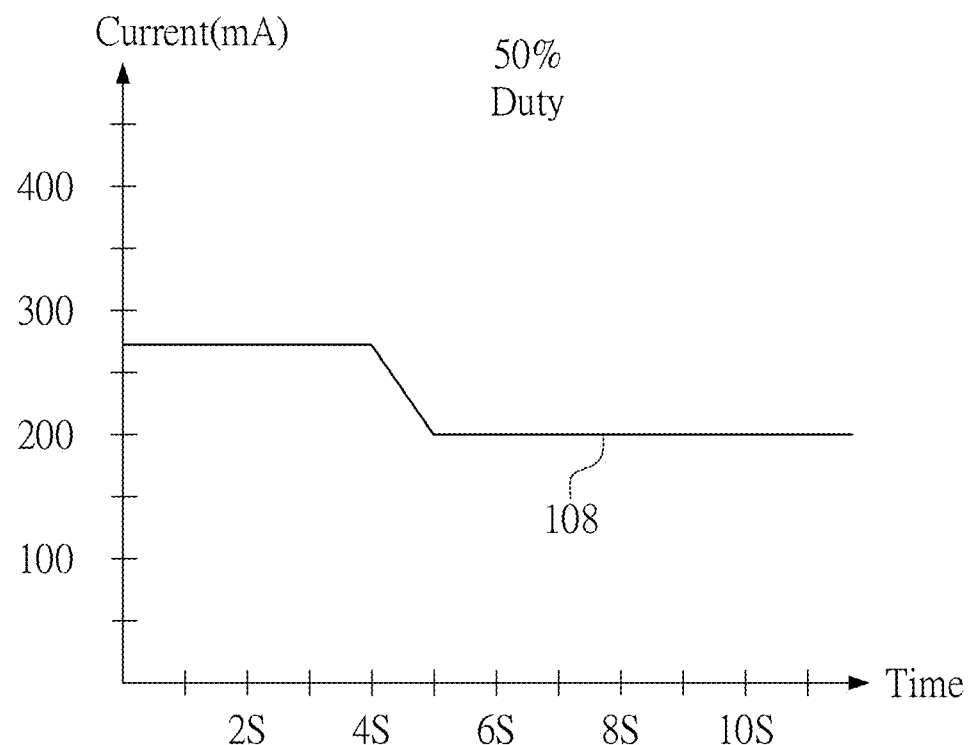
Figure 3D:
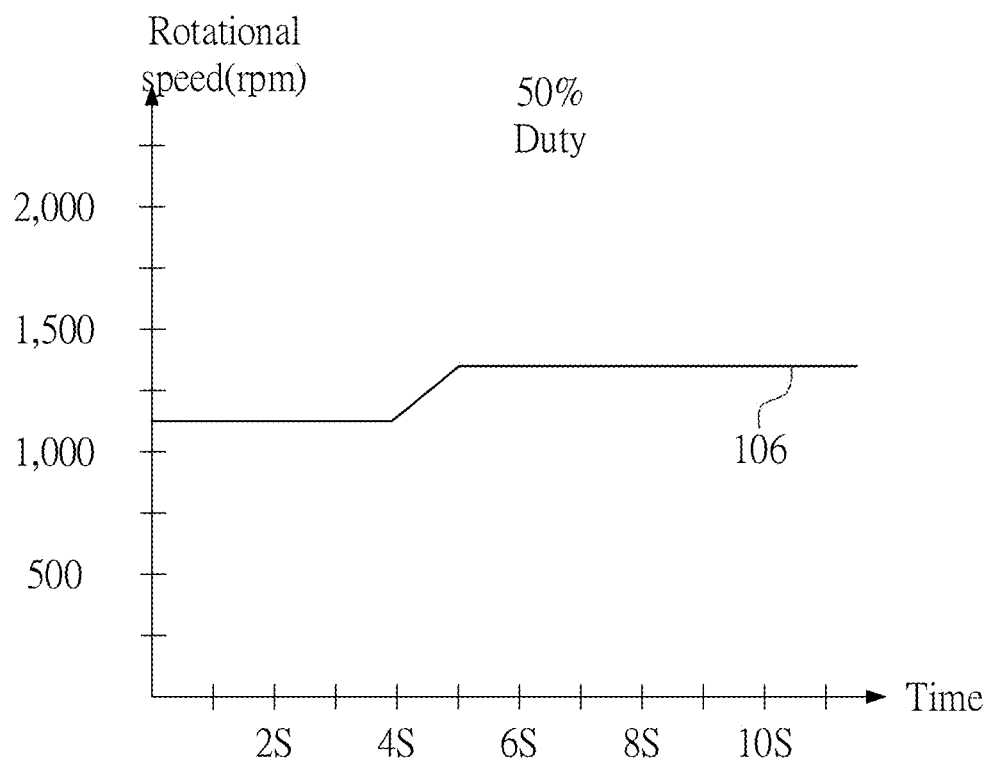
Figure 3D:
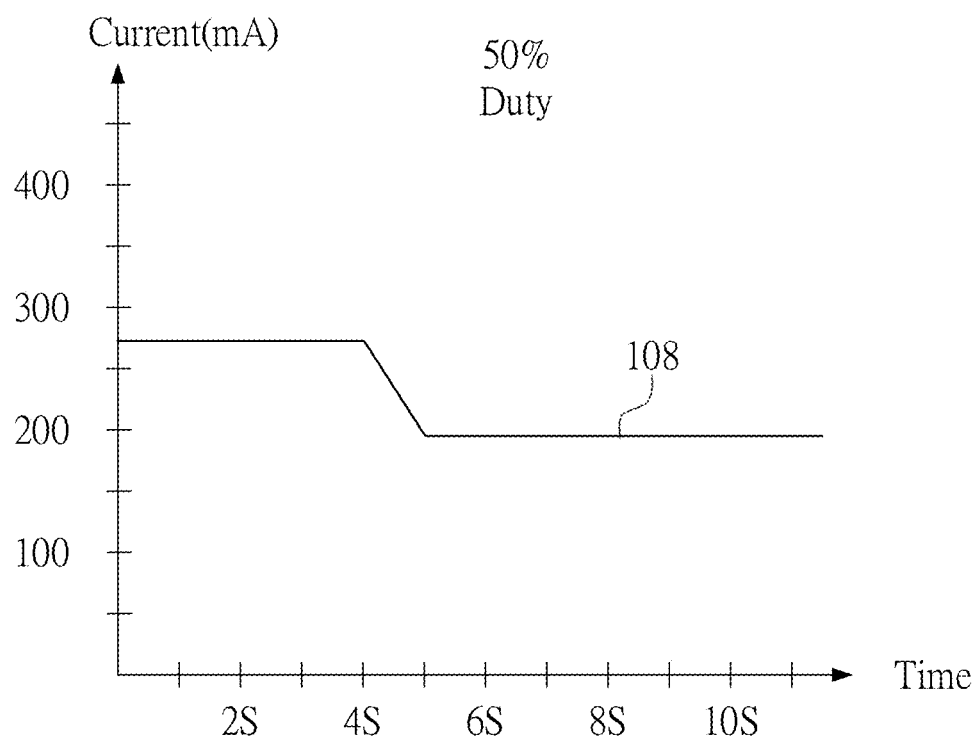

Furthermore, as shown in FIG. 3C, when the speed change amount and the current change amount show that the rotation speed 106 becomes lower instantly and the instant current value 108 also becomes lower, it indicates that the system voltage rapidly drops possibly, and this is the environment abnormal condition which can be simultaneously determined in the present invention.

Furthermore, in the embodiments of FIGS. 3B to 3D, the duty of the PWM signal is set as 50%. When the duty of the PWM signal is continuously kept in 50% and no special condition occurs, the obtained instant speed value 106 and the instant current value 108 should not drift. When a significant drift occurs on one of the instant speed value 106 and the instant current value 108 for a preset time, it can determine that an environment abnormal condition occurs. Even in case of the fan aging, the rapid variation does not occur instantly. In another embodiment of the present invention, the DC voltage signal can be applied as the control signal, and the same result can be obtained, so detailed descriptions are not repeated herein.

Furthermore, another embodiment of the present invention can apply single instant change value, such as the change in one of the instant speed value or the instant current value, to determine whether the environment abnormal condition occurs.

Figure 4A:
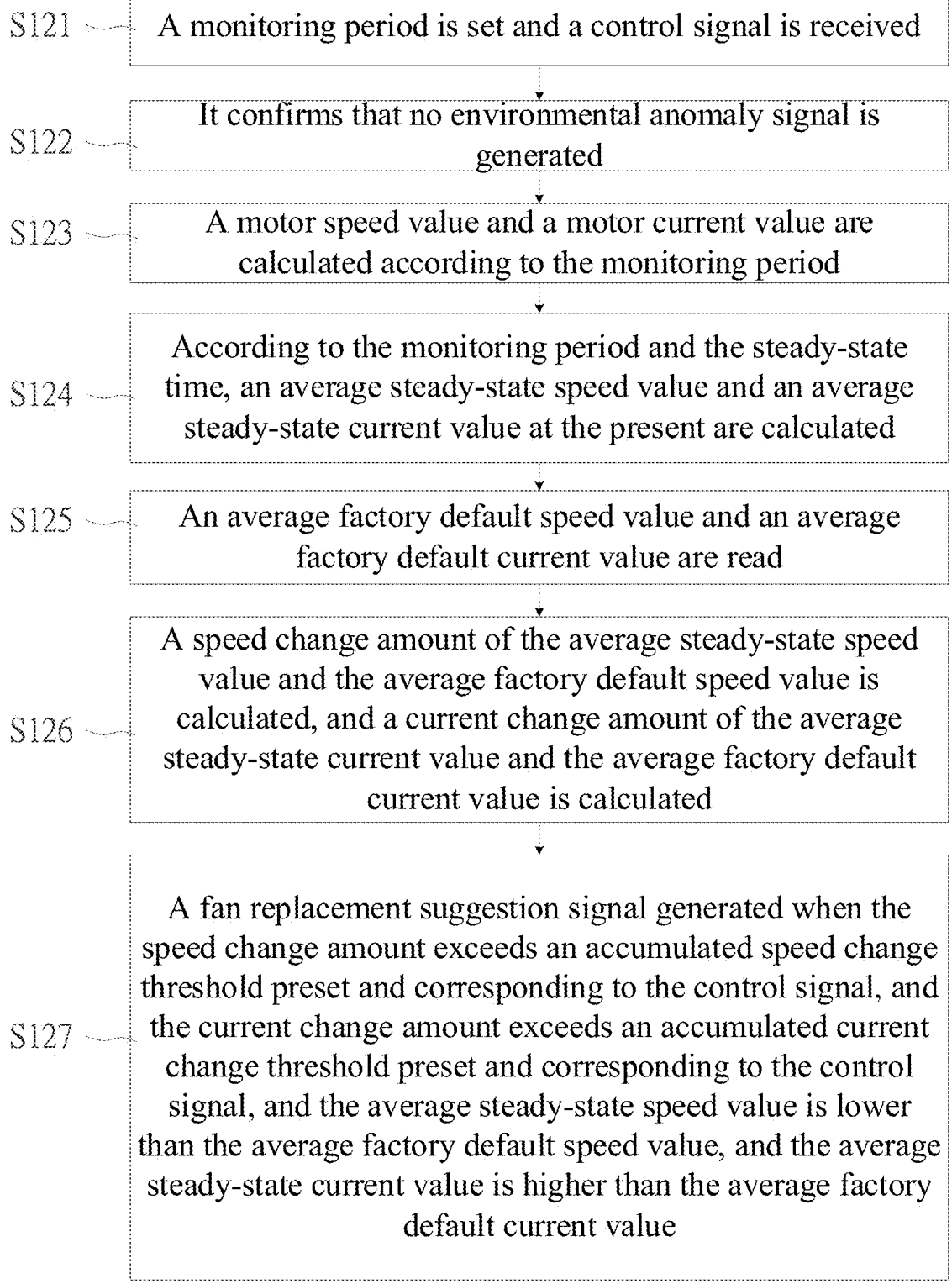
FIGS. 4A to 4B are a flowchart of a method for operation status diagnosis of a fan, and a data diagram of the fan corresponding to an abnormal environmental change, according to another embodiment of the present invention, respectively.
Figure 4B:
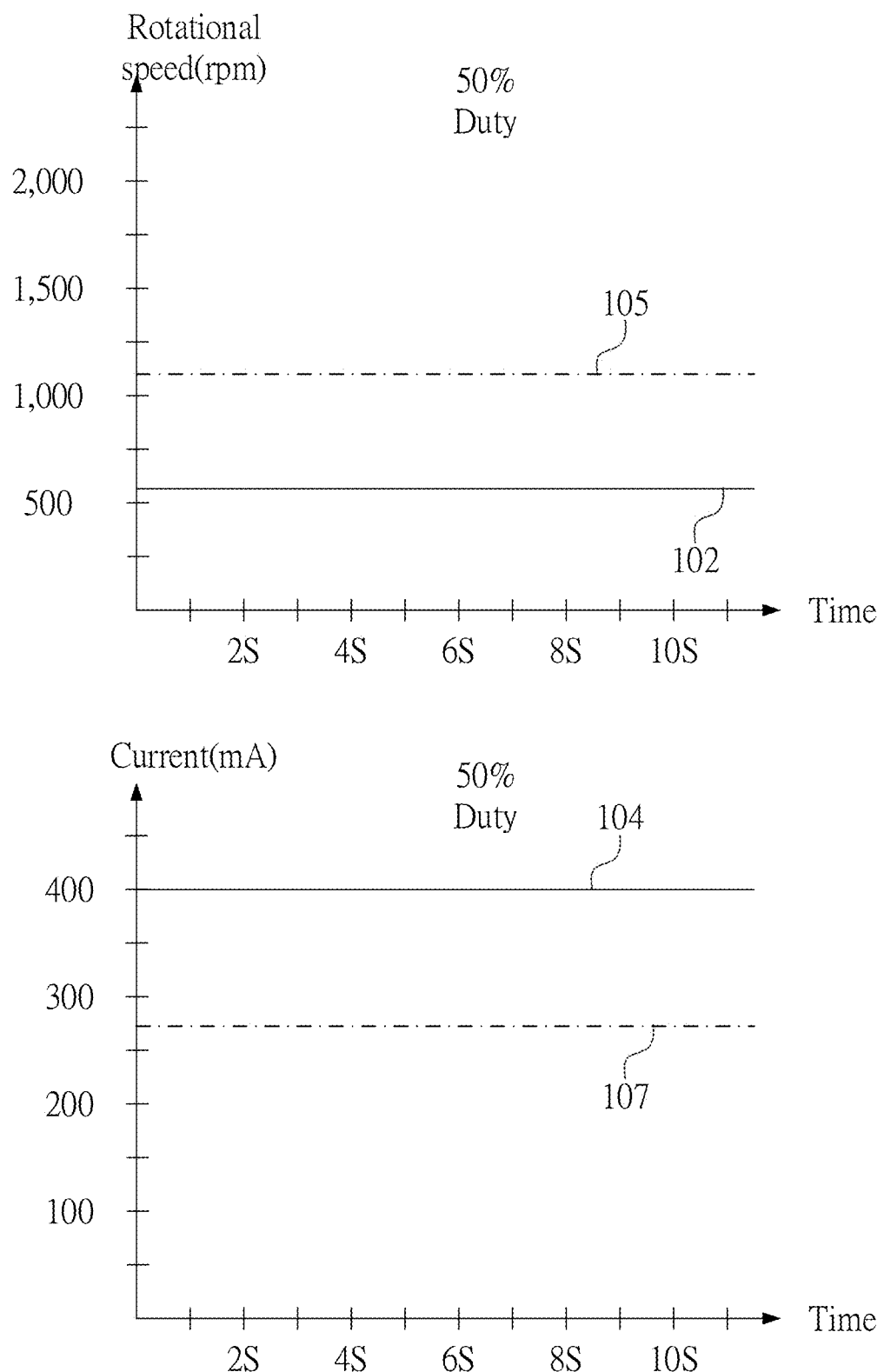

Please refer to FIGS. 4A and 4B, which are a flowchart of a method for operation status diagnosis of a fan, and a data diagram corresponding to the fan when several abnormal environmental change occurs, according to another embodiment of the present invention, respectively. The flow includes steps S121 to S127.

In a step S121, the monitoring period is set and the control signal is received. In an embodiment, the monitoring period can be set as, for example, 0.1 seconds, 0.5 seconds, 1 second, or the like. In an embodiment, the control signal can be a PWM signal or a voltage signal.

In a step S122, it confirms that no environmental anomaly signal is generated. In other words, the abnormal conditions described in the embodiments of FIGS. 2A to 2D are not occurred.

In a step S123, the motor speed value and the motor current value are calculated according to the monitoring period. The calculation formulas of the motor speed value and the motor current value are the same as the above-mentioned manner, so detailed descriptions are not repeated herein.

In a step S124, according to the monitoring period and the steady-state time, an average steady-state speed value and an average steady-state current value at the present are calculated.

In a step S125, an average factory default speed value and an average factory default current value are read. In an embodiment, the average factory default speed value and the average factory default current value are stored in the memory of the microcontroller 13.

In a step S126, a speed change amount of the average steady-state speed value and the average factory default speed value is calculated, and a current change amount of the average steady-state current value and the average factory default current value is calculated.

In a step S127, a fan replacement suggestion signal generated when the speed change amount exceeds an accumulated speed change threshold preset and corresponding to the control signal, and the current change amount exceeds an accumulated current change threshold preset and corresponding to the control signal, and the average steady-state speed value is lower than the average factory default speed value, and the average steady-state current value is higher than the average factory default current value. In an embodiment, the accumulated speed change threshold can be defined as 20% or more of the average factory default speed value, and the accumulated current change threshold can be defined as 20% or more of the average factory default current value. When above conditions are satisfied, it can determine that the fan reaches the end of its lifespan.

The accumulated speed change threshold and the accumulated current change threshold used in the step S127 to determine the lifespan of the fan can depend on different fan; for example, the accumulated speed change threshold and the accumulated current change threshold can be set as 15%, 20%, 25% or 30%. These change thresholds can be prestored in the microcontroller 13, and the process of determining whether to replace the fan can be executed by the microcontroller 13, so that the control board does not need to calculate whether to replace the fan, thereby effectively reducing the burden of the control board and also preventing undesired misjudgment. This is another special technical effect of the present invention.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method for an operation status diagnosis of a fan, wherein a microcontroller is used to perform the operation status diagnosis on a fan body comprising a motor and the fan, and the method comprises:
   setting a monitoring period, and receiving a control signal;
   driving the motor to operate according to the control signal, and reading an average steady-state speed value and an average steady-state current value stored in the microcontroller;
   calculating a motor speed value and a motor current value, according to the monitoring period;

calculating an average instant steady-state speed value and an average instant steady-state current value, according to the monitoring period and a steady-state time;

calculating a steady-state speed change amount between the average steady-state speed value and the average instant steady-state speed value, and calculating a steady-state current change amount between the average steady-state current value and the average instant steady-state current value; and generating an environmental anomaly signal when the steady-state speed change amount and the steady-state current change amount exceed a steady-state speed change threshold and a steady-state current change threshold, respectively.

2. The method according to claim 1, wherein the control signal is a PWM signal or a voltage signal.

3. The method according to claim 1, wherein the steady-state speed change threshold and the steady-state current change threshold are defined for a condition where the average instant steady-state speed value is higher than the average steady-state speed value and the average instant steady-state current value is lower than the average steady-state current value, or for a condition where the average instant steady-state speed value is lower than the average steady-state speed value and the average instant steady-state current value is higher than the average steady-state current value.

4. The method according to claim 1, wherein the steady-state speed change threshold is defined as 3% or more of the average steady-state speed value, and the steady-state current change threshold is defined as 3% or more of the average steady-state current value.

5. A method for an operation status diagnosis of a fan, wherein a microcontroller is used to perform the operation status diagnosis on a fan body comprising a motor and a fan, and the method comprises:

setting a monitoring period, and receiving a control signal;

driving the motor to operate according to the control signal;

calculating a motor speed value and a motor current value according to the monitoring period;

calculating an instant speed change amount of the motor speed value and an instant current change amount of the motor current value, according to the monitoring period; and generating an environmental anomaly signal when the instant speed change amount exceeds a speed change threshold corresponding to an instant control signal, and the current change amount exceed a current change threshold corresponding to the control signal for a period of time.

6. The method according to claim 5, wherein the control signal is a PWM signal or a voltage signal.

7. The method according to claim 5, wherein the speed change threshold and the current change threshold are defined for a condition where the instant speed change amount is a positive value and the instant current change amount is a negative value, or for a condition where the instant speed change amount is a negative value and the instant current change amount is a positive value.

8. The method according to claim 5, wherein the speed change threshold is 3% or more of an average of the motor speed value before change, and the current change threshold is 3% or more of an average of the current value before change.

9. A method for an operation status diagnosis of a fan, wherein a microcontroller is used to perform operation status diagnosis on a fan body comprising a motor and the fan, and the method comprises:

setting a monitoring period, and receiving a control signal;

confirming that the environmental anomaly signal according to claim 5 is not generated;

calculating a motor speed value and a motor current value, according to the monitoring period;

according to the monitoring period and the steady-state time, calculating an average steady-state speed value and an average steady-state current value at the present;

reading an average factory default speed value and an average factory default current value;

calculating a speed change amount between the average steady-state speed value and the average factory default speed value, and calculating a current change amount between the average steady-state current value and the average factory default current value; and generating a fan replacement suggestion signal when the speed change amount exceeds an accumulated speed change threshold corresponding to the control signal, and the current change amount exceeds an accumulated current change threshold corresponding to the control signal, and the average steady-state speed value is lower than the average factory default speed value, and the average steady-state current value is higher than the average factory default current value.

10. The method according to claim 9, wherein the control signal is a PWM signal or a voltage signal.

11. The method according to claim 9, wherein the accumulated speed change threshold is 20% or more of the average factory default speed value, and the accumulated current change threshold is 20% or more of the average factory default current value.

12. A device for an operation status diagnosis of a fan, for diagnosing whether a fan body encounters an environment abnormal condition, the fan body comprising a motor, the fan and a tachometer, and the device comprising:

a microcontroller installed in the fan body and connected to a control board, configured to receive a speed signal of the tachometer, and calculate a speed value of the fan, and detect a current value of the motor during operation, wherein the microcontroller drives the motor to operate to drive the fan, according to a monitoring period and a control signal transmitted from the control board, and calculates an instant speed change amount, according to the monitoring period and calculates an instant current change amount, and when the instant speed change amount exceeds a speed change threshold corresponding to the control signal and the instant current change amount exceeds a current change threshold corresponding to the control signal for a period of time, the microcontroller generates an environmental anomaly signal.

13. The device according to claim 12, wherein the control signal is a PWM signal.

14. The device according to claim 12, wherein the control signal is a PWM signal transmitted via an I2C signal line connected to the microcontroller and the control board.

15. The device according to claim 12, wherein when the instant speed change amount is a positive value and the instant current change amount is a negative value, or the instant speed change amount is a negative value and the instant current change amount is a positive value, the microcontroller generates the environmental anomaly signal.

16. The device according to claim 12, wherein the speed change threshold is 3% or more of an average of the speed value before change, and the current change threshold is 3% or more of an average of the current value before change.

17. A method for an operation status diagnosis of a fan, wherein a fan body comprises a motor and the fan, and the method comprises:
- setting a monitoring period, and receiving a control signal;
- driving the motor to operate, according to the control signal;
- calculating a motor speed value, according to the monitoring period;
- calculating an instant speed change amount of the motor speed value, according to the monitoring period; and
- generating an environmental anomaly signal when the instant speed change amount exceeds a preset speed change threshold corresponding to the control signal for a period of time.

18. The method according to claim 17, wherein the control signal is a PWM signal or a voltage signal.

19. The method according to claim 17, wherein the speed change threshold is defined as 3% or more of an average of the motor speed value before change.

20. A method for an operation status diagnosis of a fan, wherein a microcontroller is used to perform an operation status diagnosis on a fan body comprising a motor and the fan, and the method comprises:
- setting a monitoring period, and receiving a control signal;
- driving a motor to operate, according to the control signal;
- calculating a motor current value, according to the monitoring period;
- calculating an instant current change amount of the motor current value, according to the monitoring period; and
- generating an environmental anomaly signal when the instant current change amount exceeds a current change threshold corresponding to the control signal for a period of time.

21. The method according to claim 20, wherein the control signal is a PWM signal or a voltage signal.

22. The method according to claim 20, wherein the current change threshold is 3% or more of an average of the current value before change.

* * * * *